(12) United States Patent
Johansson et al.

(10) Patent No.: US 10,060,566 B2
(45) Date of Patent: Aug. 28, 2018

(54) PULSATION DAMPER SUITABLE FOR HYGIENIC PROCESSING LINES

(71) Applicant: Tetra Laval Holdings & Finance S.A., Pully (CH)

(72) Inventors: Fredrik Johansson, Lund (SE); Rikard Hansson, Eslov (SE); Tomas Skoglund, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 358 days.

(21) Appl. No.: 14/767,244

(22) PCT Filed: Feb. 7, 2014

(86) PCT No.: PCT/EP2014/052473
§ 371 (c)(1),
(2) Date: Aug. 11, 2015

(87) PCT Pub. No.: WO2014/122282
PCT Pub. Date: Aug. 14, 2014

(65) Prior Publication Data
US 2016/0003399 A1    Jan. 7, 2016

(30) Foreign Application Priority Data

Feb. 11, 2013    (SE) ...................................... 1350158

(51) Int. Cl.
*F04B 11/00*    (2006.01)
*F16L 55/04*    (2006.01)
*F16L 55/033*    (2006.01)

(52) U.S. Cl.
CPC .............. *F16L 55/04* (2013.01); *F04B 11/00* (2013.01); *F04B 11/0091* (2013.01);
(Continued)

(58) Field of Classification Search
CPC ..... F16L 55/04; F16L 55/033; F16L 55/0337; F16L 55/0332; F04B 11/00; F04B 11/0091; F04B 11/0008
See application file for complete search history.

(56) References Cited

U.S. PATENT DOCUMENTS

| | | | | |
|---|---|---|---|---|
| 2,875,787 A | * | 3/1959 | Evans ................... | F16L 55/052 138/30 |
| 3,606,597 A | * | 9/1971 | Russel ................ | F04B 11/0016 417/542 |

(Continued)

FOREIGN PATENT DOCUMENTS

| | | |
|---|---|---|
| CH | 265 283 A | 11/1949 |
| DE | 3927218 A1 | 2/1991 |

(Continued)

OTHER PUBLICATIONS

International Search Report (PCT/ISA/210) dated Apr. 22, 2014, by the Swedish Patent Office as the International Searching Authority for International Application No. PCT/EP2014/052473.

(Continued)

*Primary Examiner* — Charles Freay
(74) *Attorney, Agent, or Firm* — Buchanan Ingersoll & Rooney PC (57) ABSTRACT

A pulsation damper configured to reduce pressure peaks in a pipe system. The pulsation damper comprises an elastic pipe section arranged to be in a small volume state or a large volume state. A first volume held in the elastic pipe section in the large volume state is greater than a second volume held in the elastic pipe section in the small volume state. The elastic pipe section has an elliptical cross section in the small volume state. A ratio between a major axis and a minor axis of the elastic pipe section is in the range 1,05 to 10,0, such as 1,1 to 1,5.

12 Claims, 5 Drawing Sheets

(52) U.S. Cl.
CPC ......... *F16L 55/033* (2013.01); *F16L 55/0332* (2013.01); *F16L 55/0337* (2013.01)

(56) References Cited

U.S. PATENT DOCUMENTS

| | | | |
|---|---|---|---|
| 4,993,512 A | | 2/1991 | Lescher |
| 5,111,848 A | * | 5/1992 | Inukai ................... F16L 55/04 137/1 |
| 6,675,657 B1 | * | 1/2004 | KalTsounis ............ F02M 55/04 73/730 |
| 7,278,837 B2 | * | 10/2007 | Malmberg .......... F04B 11/0025 417/540 |
| 2009/0205735 A1 | | 8/2009 | Schmelter et al. |
| 2009/0205835 A1 | * | 8/2009 | Themig ................. E21B 29/00 166/377 |

FOREIGN PATENT DOCUMENTS

| | | |
|---|---|---|
| DE | 196 54 098 A1 | 6/1998 |
| DE | 10 2006 050945 A1 | 4/2008 |
| FR | 2 620 169 A1 | 3/1989 |
| GB | 2 129 876 A | 5/1984 |
| GB | 2 191 820 A | 12/1987 |
| WO | WO 00/10748 A1 | 3/2000 |

OTHER PUBLICATIONS

English Translation of the Office Action (Notification of the Third Office Action) dated Sep. 1, 2017, by the Chinese Patent Office in corresponding Chinese Patent Application No. 201480007895.X. (3 pages).

* cited by examiner

*Fig 1*

PRIOR ART

*Fig 2*

PRIOR ART

PULSATION DAMPER SUITABLE FOR HYGIENIC PROCESSING LINES

TECHNICAL FIELD

The invention generally relates to the field of processing technology. More particularly, it relates to a pulsation damper for reducing the influence of pressure peaks generated for instance by a homogenizer comprising a piston pump.

BACKGROUND OF THE INVENTION

Today, in processing systems it is common practice to have dampers for a piston pump. By having the dampers the pressure peaks formed when the pistons are moving back and forth are reduced and hence the negative effects for the homogenizer as well as other parts of the systems can be reduced.

One common type of pulsation dampers used in this field is partly air filled upright tubes placed upstream and downstream the piston pump. In short, when a pressure peak arises the air is compressed, thereby resulting in a damping effect. One disadvantage of this design is that it is most often cleaned manually since the air filled upright tube constitutes a dead end and hence is difficult to clean automatically using cleaning in place (CIP) procedures.

Another disadvantage is that the air will be consumed over time due to that the air is dissolved in a liquid product being processed. Thus, this kind of pulsation dampers needs to be filled with air from time to time.

In U.S. Pat. No. 7,278,837 it is suggested to connect the two pulsation dampers with each other via a tube provided with a shut off valve. Thanks to the tube connecting the two pulsation dampers the pulsation dampers may be cleaned automatically.

Another type of pulsation damper is described in GB 2 129 876. The pulsation damper consists essentially of a centre zone with non-circular sections so that it may flex under pressure towards a circular section and resiliently expand to absorb the pulsations.

Although different types of pulsation dampers have been developed there is still a need for cost efficient damper solutions providing for efficient damping, robust design, secured hygiene and low total cost of ownership.

SUMMARY

Accordingly, the present invention preferably seeks to mitigate, alleviate or eliminate one or more of the above-identified deficiencies in the art and disadvantages singly or in any combination and solves at least the above mentioned problems e.g. by providing a pulsation damper capable of damping the pulsation formed by pistons and yet being possible to clean using automatic cleaning in place procedures.

According to a first aspect it is provided a a pulsation damper configured to reduce pressure peaks in a pipe system. The pulsation damper may comprise an elastic pipe section arranged to be in a small volume state or a large volume state, wherein a first volume V1 held in said elastic pipe section in said large volume state is greater than a second volume V2 held in said elastic pipe section in said small volume state. The elastic pipe section may have an elliptical cross section in said small volume state. A ratio between a major axis and a minor axis of said elastic pipe section may be in the range 1.05 to 10.0, such as 1.1 to 1.5.

At least in one point of said elastic pipe section a cross sectional area may be larger when said elastic pipe section is in said large volume state compared to when said elastic pipe section is in said small volume state.

The elastic pipe section may have an elliptical cross section in said large volume state.

A major axis of said elastic pipe section may be horizontal when said pulsation damper is in use.

The pulsation damper may further comprise an upstream transition pipe section arranged upstream said elastic pipe section connecting said elastic pipe section to said pipe system, wherein said cross sectional area of said elastic pipe section is less than 100% larger compared to an inlet cross sectional area of said upstream transition pipe.

An inlet of said upstream transition pipe section may be circular.

The pulsation damper may further comprise a downstream transition pipe section arranged downstream said elastic pipe section connecting said elastic pipe section to said pipe system, wherein said cross sectional area of said elastic pipe section is less than 100% larger compared to an inlet cross sectional area of said downstream transition pipe.

The elastic pipe section may be divided in several elastic sub-sections.

The sub-sections may in use be placed vertically.

According to a second aspect it is provided a piston pump arrangement comprising a piston pump and a first pulsation damper according to the first aspect, wherein said first pulsation damper being placed upstream said piston pump.

The piston pump arrangement may further comprise a second pulsation damper according to the first aspect, wherein said second pulsation damper being placed downstream said piston pump.

According to a third aspect it is provided a piston pump arrangement comprising a piston pump and a second pulsation damper according to the first aspect, wherein said second pulsation damper being placed downstream said piston pump.

The piston pump arrangement according to the second or third aspect may be part of a homogenizer.

According to a fourth aspect it is provided a method for producing an elastic pipe section for said pulsation damper according to the first aspect. The method may comprise placing a non-elliptical piece of material in a forming tool, and forming said non-elliptical piece of material to said elastic pipe section.

The step of forming said non-elliptical piece of material to said elastic pipe section may be made by using hydroforming.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein.

DETAILED DESCRIPTION OF PREFERRED EMBODIMENTS

Figure 1:
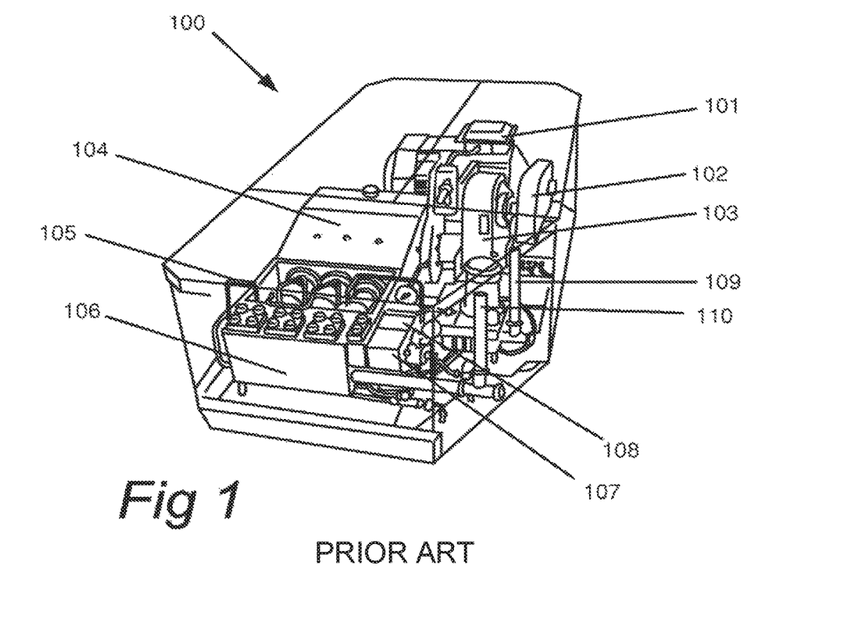
FIG. 1 illustrates a homogenizer.

FIG. 1 generally illustrates a homogenizer 100, more particularly a homogenizer sold under the name Tetra Alex™ by Tetra Pak. Generally speaking, the homogenizer 100 comprises two main parts, a high pressure pump and a homgenising device. The high pressure pump forms a high pressure and the homogenising device provides one or several gaps through which the product is forced with the effect that the size of the fat globules are decreased. Further effects of homogenization is more appetizing colour, reduced sensitivity to fat oxidation, more full-bodied flavour and better stability of cultured milk products.

In this example, the high pressure pump is a piston pump driven by a main drive motor 101 connected via a belt transmission 102 and a gearbox 103 to a crankshaft placed in a crankcase 104. By using the crankshaft the rotary motion is converted to a reciprocating motion driving pump pistons 105 back and forth. Today, it is common to have three to five pump pistons.

The pump pistons 105 run in cavities formed in a pump block 106 made to withstand the high pressure created by the pump pistons. Today it is common to increase the pressure from 300 kPa (3 bar) to about 10-25 MPa (100-250 bar), but higher pressures can be used as well.

Through cavities in the pump block 106 the product enters a first homogenizing device 107 and thereafter, in many cases, a second homogenizing device 108. As described above, by forcing the product through one or several gaps the properties of the product can be changed.

The reciprocating motion of the pump pistons 105 creates pulsations. To reduce the pulsations it is common practice today to place an inlet damper 109 at an inlet of the homogenizer. Further, in order to reduce vibrations and noise it is common practice to place an outlet damper 110 at an outlet.

The inlet damper 109 and the outlet damper 110 may as illustrated in FIG. 1 be vertical pipes placed next to the inlet and outlet.

Figure 2:
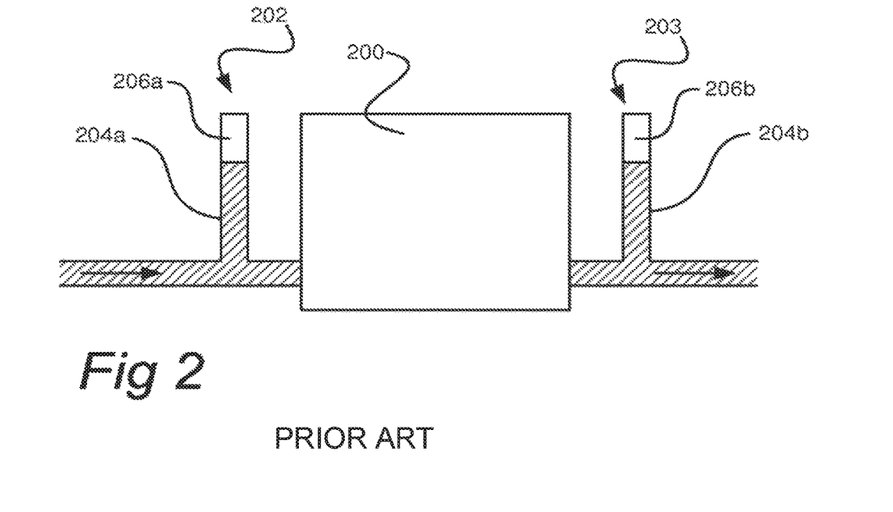
FIG. 2 illustrates air-filled vertical dampers.

FIG. 2 illustrates a homogeniser 200 provided with an inlet damper 202 and an outlet damper 203. Both the inlet damper 202 and the outlet damper 203 comprise a first section 204a, 204b filled with liquid product and a second section 206a, 206b filled with air. Since the dampers are closed at the top the air can be compressed and in this way function as a damping medium. Hence, when a pulsation, i.e. pressure peak, reaches the inlet damper 202 or the outlet damper 203 the air will be compressed and in this way part of the kinetic energy of the pulsation is transformed into static energy with the effect that the pulsation amplitude is reduced.

One of the drawbacks of having vertical pipes closed in the upper ends as dampers is that they are difficult to clean by using common cleaning in place (CIP) technology. Therefore, in order to clean these they are usually dis- mounted and cleaned manually. This is both labour intensive and reduces the uptime for the entire line, which of course is a disadvantage.

In order to solve this problem different solutions with by-pass valves have been developed. The main idea with these solutions are to have one mode for production when the upper ends are closed, for instance by closing one or several valves, and another mode during cleaning when the valves are open such that water and cleaning agents can flow through the pipes.

Figure 3:
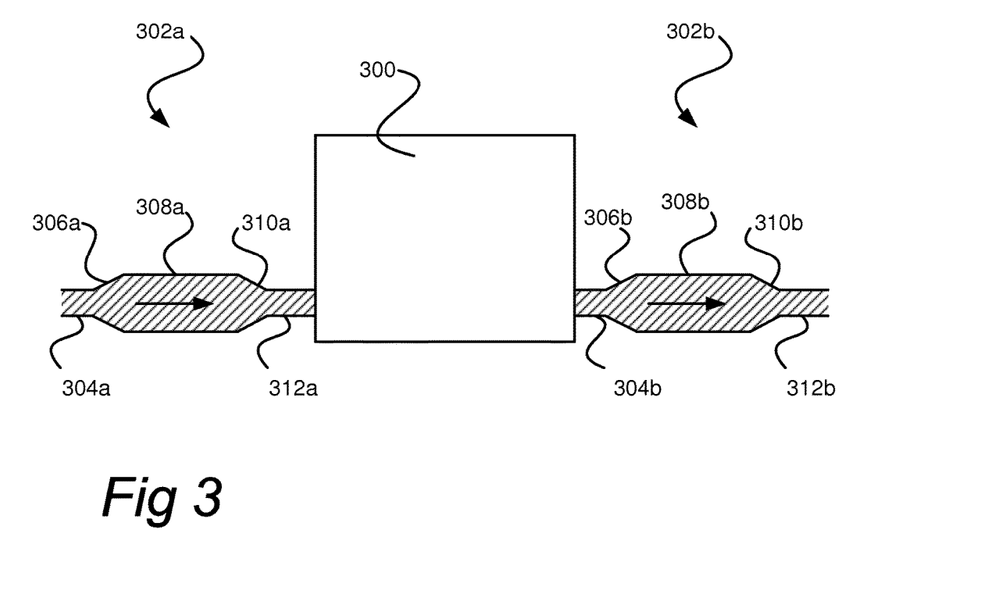
FIG. 3 illustrates generally dampers having elastic pipe sections.

FIG. 3 illustrates an example set up comprising a homogenizer 300 provided with an inlet damper 302a and an outlet damper 302b. In the example the inlet damper 302a and the outlet damper 302b are both provided with an elliptical cross section. Other options are to only have the inlet damper 302a provided with an elliptical cross-section, or to only have the outlet damper 302b provided with an elliptical cross-section.

In this example, for both the inlet damper 302a and the outlet damper 302b, a first connection pipe 304a, 304b, which can be a stainless steel pipe with a circular cross section, is attached to a first transition section 306a, 306b in turn connected to a damper section 308a, 308b with an elliptical cross section. The damper section 308a, 308b can in turn be connected to a second transition section 310a, 310b, in turn connected to a second connection pipe 312a, 312b, which also can be a stainless steel pipe with a circular cross section. An advantage of having the first connection pipe 304a, 304b and the second connection pipe 312a, 312b provided with a circular cross section is that today's standard connections can be used.

As illustrated in FIG. 3, in order to provide for a good damping efficiency the damper section 308a, 308b may have a larger cross sectional area compared to the first connection pipes 304a, 304b and the second connection pipes 3012a, 312b. On the other hand, in order to provide for efficient cleaning, more particularly cleaning in place (CIP), the cross sectional area of the damper section 308a, 308b should not differ too much compared to the connection pipes since this will lead to less efficient cleaning in the damper sections 308a, 308b.

Figure 4A:
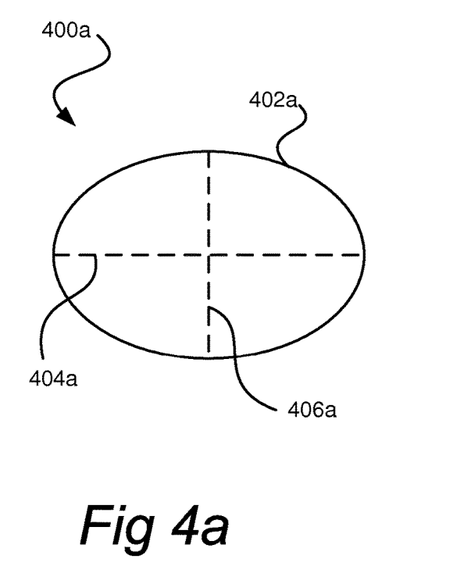
FIGS. 4a and 4b illustrate an example of a cross section of an elastic pipe section in a small volume state and a large volume state.
Figure 4B:
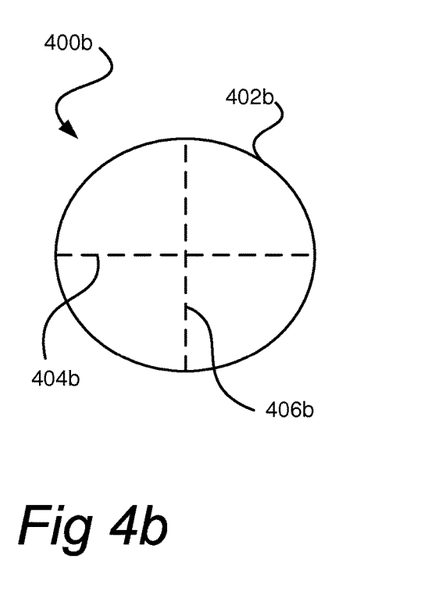

By having elliptical damper sections 308a, 308b made in an elastic material, such as stainless steel, the elliptical damper sections may change from a low pressure state with an elliptical cross section, as illustrated by example in FIG. 4a, to a high pressure state with a less elliptical cross section, or put differently a more circular cross section, as illustrated by example in FIG. 4b. In the high pressure state, the damper section 308a, 308b will be able to hold a larger volume compared to the low pressure state providing for that the pulsation will be damped.

As stated above, the cross sectional area of the damper sections 308a, 308b should not differ too much from the cross sectional area of the connection pipes in order to provide for efficient cleaning in place (CIP). It has however been realized that by only having the damper section capable of compensating for a small volume, less than 100 ml, more specifically about 10-50 ml, the pressure pulsations can be significantly reduced. Therefore, due to the small volume required for damping pulsations, it has been realized that elliptical damper sections 308a, 308b that can reduce pulsations efficiently and that can be cleaned efficiently is possible to achieve.

As illustrated in FIG. 4a, in the low pressure state, a cross section 400a of the damper section during normal operation can be elliptical. A circumference 402a, and a major axis 404a and a minor axis 406a are illustrated. The major axis 404a can be greater than the minor axis 406a in the low pressure state.

When a pulsation, i.e. pressure peak, enters the damper section, the damper section can due to the elasticity of the stainless steel, or other elastic material used for the damper section, force the cross section to go towards a more circular cross section 400b, as illustrated in FIG. 4b, to the high pressure state. By doing so the volume held in the damper section will increase in turn having the effect that the pulsation is reduced. A circumference 402b in this state is more or less the same as in the low pressure state. However, a major axis 404b can be reduced and correspondingly the minor axis 406b can be increased.

In order to provide for a long lasting damper section, the damper section can be made as an elliptical element, for instance by using hydroforming.

Further, in order to provide for an efficient damping, a long lasting damper section or that the amount of material used is kept at a low level the thickness of the damper section may differ between different parts of the damper section, both around the periphery, but also over a length of the damper section.

Figure 5:
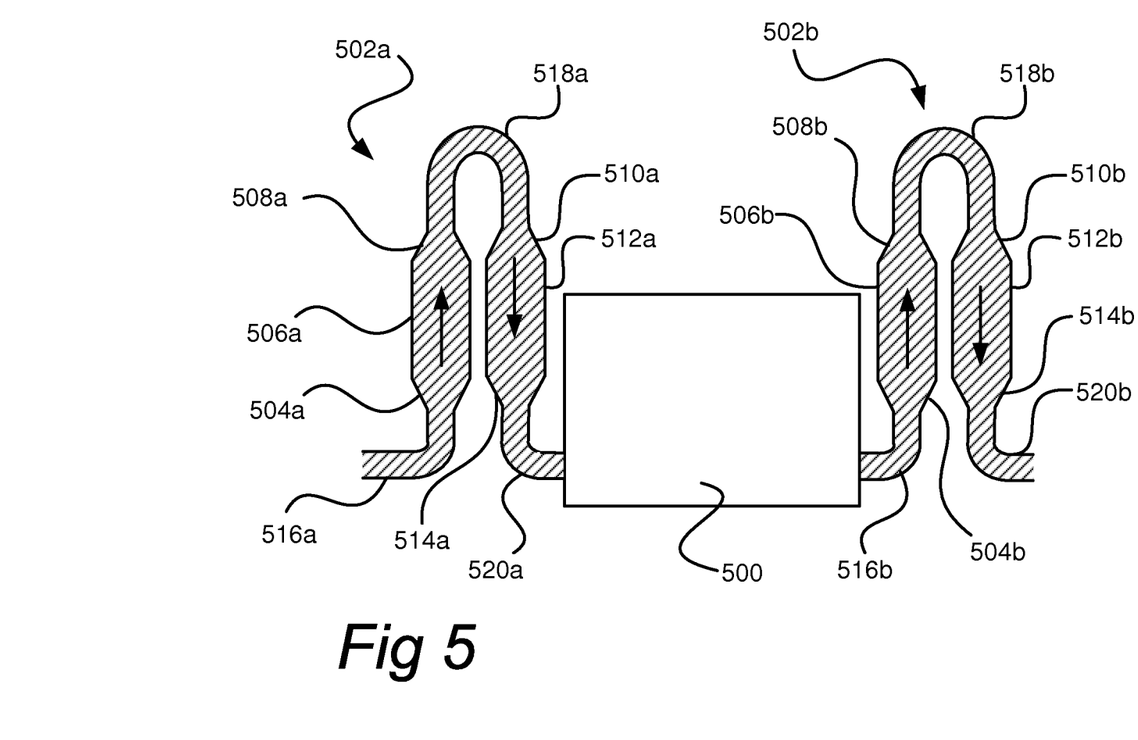
FIG. 5 illustrates an example of a set up with elastic pipe sections placed vertically in order to reduce the footprint.

FIG. 5 illustrates an example of a homogenizer 500 provided with an inlet damper 502a and an outlet damper 502b. Unlike the inlet and outlet dampers illustrated in FIG. 3, the inlet damper 502a and the outlet damper 502b are divided in two parts, or to use another word sub-sections. As illustrated, a first part of the inlet damper 502a may comprise a first transition element 504a connected to a first damper section 506a in turn connected to a second transition element 508a. A second part may comprise a third transition element 510a connected to a second damper section 512a, in turn connected to a fourth transition element 514a. Further, the first part may be connected to a first connection pipe 516a. The first and second part may be connected via a second connection pipe 518a and the second part may be connected to the homogenizer 500 via a third connection pipe 520a. In order to reduce the footprint, that is, the area being occupied, the second connection pipe 518a may be a U-bend pipe. By having such a U-bend pipe and having the first and second damper sections 506a, 512a placed vertically the foot print can be kept at a low level at the same time as efficient damping can be achieved.

In a corresponding way, the outlet damper 502b may be divided in two parts, or to use another word sub-sections. The first part may comprise a fifth transition element 504b connected to a third damper section 506b in turn connected to a sixth transition element 508b. The second part may comprise a seventh transition element 510b connected to a fourth damper section 512b in turn connected to an eighth transition element 514b. The first part may be connected to the homogenizer 500 via a fourth connection pipe 516b, the first and second part may be connected via a fifth connection pipe 518b, and the second part may be connected to a sixth connection pipe 520b. As with the inlet damper 502a, the fifth connection element 518b may be a U-bend pipe such that the footprint can be reduced when having the damper sections placed vertically.

Alternatively, even though not illustrated, the damper sections can be placed horizontally.

If having several damper sections, the different damper sections may have different radii, different thickness and different material in order to provide an efficient overall damping efficiency.

Further, although not illustrated and as set forth above not needed in many cases due to the small volume that needs to be compensated for, CIP valves may be provided before and after the damper sections such that additional water or cleaning solutions can be provided over the damper sections during cleaning, thereby compensating for the increased cross sectional area in the damper sections.

The concept of dividing the damper into several damper sections may have a large effect on the cost efficiency as well. This concept namely makes it possible to produce and store one and the same type of damper section and to build the damper by combining a number of damper sections together. A further effect on cost is that it is easier to produce a small damper section, for instance in the range of 0.3 to 1.5 meter, compared to a larger damper section, for instance in the range of 4 meter. For instance, if using hydroforming for producing the damper sections, it is easier to develop a tool for making a small element, for instance about 1 meter long, than a large one for instance about 4 meters long.

Figure 6:
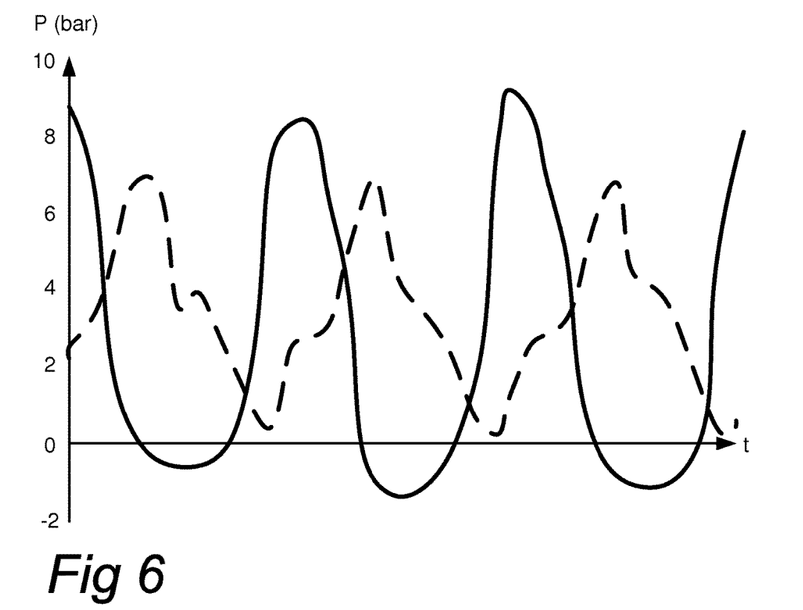
FIG. 6 illustrates an example of pulsations caused by a homogenizer with a circular pipe as damper.

FIG. 6 illustrates a graph showing measured pressure before and after a homogenizer capable of providing a homogenization pressure of 20 MPa (200 bar) in a food processing line having a feed pressure of 300 kPa (3 bar) and as an inlet damper and as an outlet damper having a circular pipe having an inlet diameter of 101.6 mm, an outlet diamater of 76 mm, a thickness of 2 mm and a length of about 2 m made of stainless steel. The dotted line illustrates the pressure before the homogenizer and the full line illustrates the pressure after the homogenizer. As illustrated, the pressure before the homogenizer will be in the range from about 100 kPa (1 bar) to about 700 kPa (7 bar). After the homogenizer the pressure will vary even more, from about −100 kPa (−1 bar), that is back pressure, to about 900 kPa (9 bar).

Figure 7:
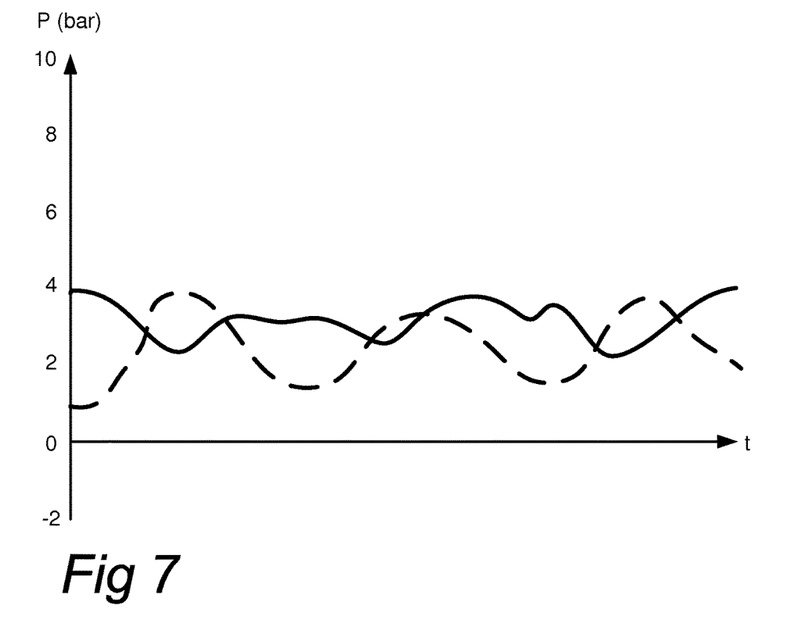
FIG. 7 illustrates an example of pulsations caused by the homogenizer with an elliptical pipe as damper.

FIG. 7 illustrates a graph showing measured pressure before and after the homogenizer with the same conditions as set forth above, but with the difference that instead of having the circular pipe this is replaced by an elliptical pipe with a major axis of 106 mm and a minor axis of 89 mm, otherwise similar. As illustrated, the measured pressure before the homogenizer (dotted line) varies between 100 kPa (1 bar) and 400 kPa (4 bar), and the measured pressure after the homogenizer (full line) varies between 200 kPa (2 bar) and 400 kPa (4 bar).

In the example illustrated in FIG. 6 and FIG. 7, when raising pressure from 300 kPa (3 bar) to 400 kPa (4 bar) the elliptical pipe will move towards a more circular cross section having the effect that an increased volume can be held.

Figure 8:
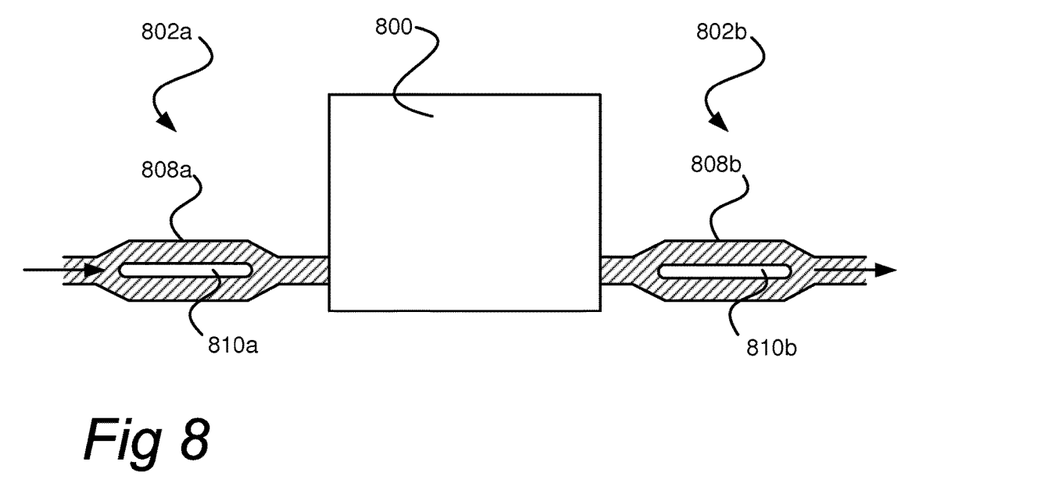
FIG. 8 generally illustrates a cross sectional view of an example of dampers having elastic pipe sections and volume increasing elements.

FIG. 8 illustrates an example set up comprising a homogenizer 800 provided with a first pulsation damper 802a and a second pulsation damper 802b, both based on damper sections 808a, 808b similar to the pulsation dampers illustrated in FIG. 3.

However, unlike the pulsation dampers illustrated in FIG. 3, the first and second pulsation dampers are provided with a first volume increasing element 810a and a second volume increasing element 810b, respectively. Although not illustrated, supporting elements may be used for keeping the volume increasing elements 810a, 810b in place.

One advantage of having the volume increasing elements 810a, 810b is that they provide for that the cross sectional areas of the damper sections 808a, 808b can be increased, in turn providing for improved damping, while the first pulsation damper 802a and the second pulsation damper 802b are still easy to clean since a cross sectional area for the flow is not increased, or at least not increased to the same extent.

In order to make sure that product are not caught in the volume increasing elements 810a, 810b these may be solid.

Figure 9A:
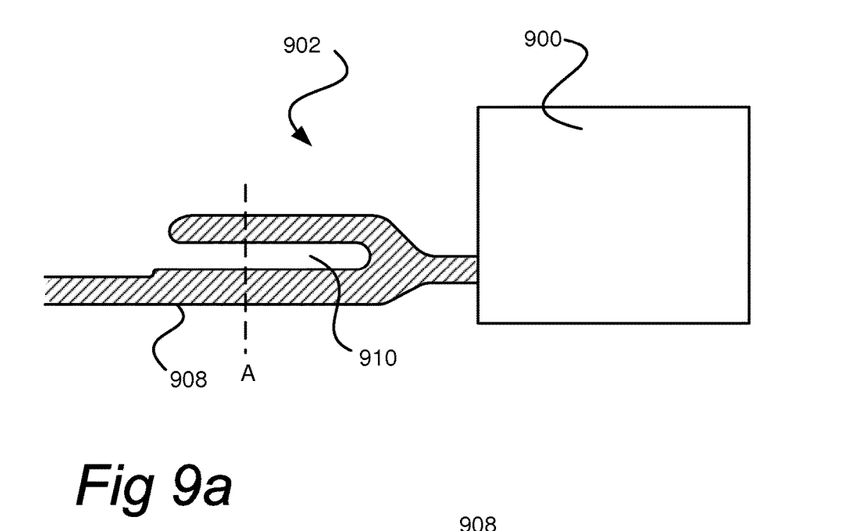
FIGS. 9a and 9b generally illustrate two cross sectional views of another example of a damper having an elastic pipe section and a volume increasing
Figure 9B:
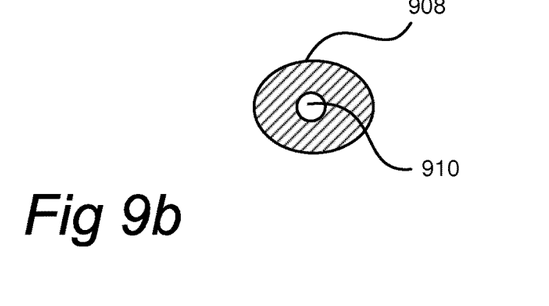

FIGS. 9a and 9b illustrate an example of a set up comprising a homogenizer 900 and a pulsation damper 902. As in the example illustrated in FIG. 8, the pulsation damper 902 can comprise an elliptical pipe section 908 and a volume increasing element 910. FIG. 9b illustrates a cross sectional view along the line A.

Unlike the example illustrated in FIG. 8, the volume increasing element 910 is a hollow body formed as a part of the elliptical pipe section 908. In this particular example the volume increasing element 910 has its open end towards an end section of the elliptical pipe section 908, but this is only one out of many alternatives. For instance, the open end may alternatively be placed downwards in order to easily detect a leakage. An advantage of having a volume increasing body 910 in the form of a hollow body is that less material is needed.

Even though the damper sections are mentioned to have elliptical cross sections, it should be understood that many of the aspects mentioned herein, such as using volume increasing elements for improved damping and placing damper sections vertically in use in order to reduce footprint, are not limited only to damper sections having elliptical cross sections, but to damper sections having non-circular cross sections in general.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A pulsation damper configured to reduce pressure peaks in a pipe system,
   said pulsation damper comprising an elastic pipe section arranged to be in a small volume state or a large volume state, wherein said elastic pipe section has an elliptical cross section in said small volume state,
   wherein a ratio between a major axis and a minor axis of said elastic pipe section is in the range 1.05 to 10.0,
   wherein said pulsation damper further comprises a volume increasing element, said volume increasing element comprising a body formed within the elliptical cross section of the elastic pipe section.

2. The pulsation damper according to claim 1, wherein at least in one point of said elastic pipe section a cross sectional area is larger when said elastic pipe section is in said large volume state compared to when said elastic pipe section is in said small volume state.

3. The pulsation damper according to claim 1, wherein said elastic pipe section has an elliptical cross section in said large volume state.

4. The pulsation damper according to claim 3, wherein a longitudinal axis of said elastic pipe section is horizontal when said pulsation damper is in use.

5. The pulsation damper according to claim 1, wherein said elastic pipe section is divided into a plurality of spaced-apart sub-sections.

6. The pulsation damper according to claim 5, wherein said spaced-apart sub-sections are spaced-apart horizontal.

7. A piston pump arrangement comprising a piston pump and a first pulsation damper according to claim 1, said first pulsation damper being placed upstream said piston pump.

8. The piston pump according to claim 7, further comprising a second pulsation damper comprising an elastic pipe section arranged to be in a small volume state or a large volume state, the elastic pipe section of the second pulsation damper has an elliptical cross section in the small volume state, and the ratio between a major axis and a minor axis of the elastic pipe section of the second pulsation damper is in the range 1.05 to 10.0, said second pulsation damper being placed downstream said piston pump.

9. A piston pump arrangement comprising a piston pump and the pulsation damper according to claim 1, said pulsation damper being placed downstream said piston pump.

10. The piston pump arrangement according to claim 7, wherein said piston pump arrangement is part of a homogenizer.

11. The pulsation damper according to claim 1, wherein the ratio between the major axis and the minor axis of the elastic pipe section is in the range 1.1 to 1.5.

12. A pulsation damper configured to reduce pressure peaks in a pipe system, said pulsation damper comprising:
   an elliptical pipe section; and
   a volume increasing element comprising a hollow body formed as a unitary element with the elliptical pipe section,
   wherein a ratio between a major axis and a minor axis of said elliptical pipe section is in the range 1.05 to 10.0.

* * * * *